June 8, 1954  J. ENOS, JR  2,680,343
SIDE DELIVERY RAKE

Filed May 5, 1949  3 Sheets-Sheet 1

INVENTOR.
JOE ENOS, JR.
BY
ATTORNEYS

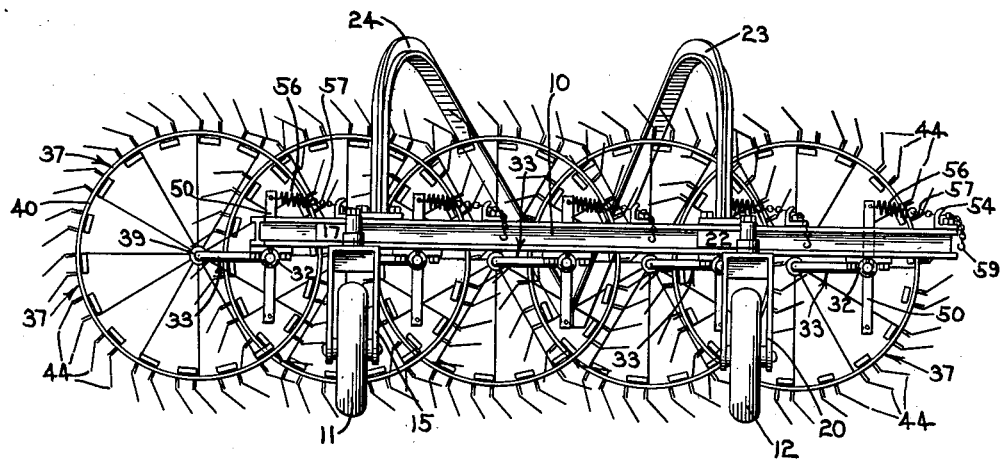
Fig. 3.
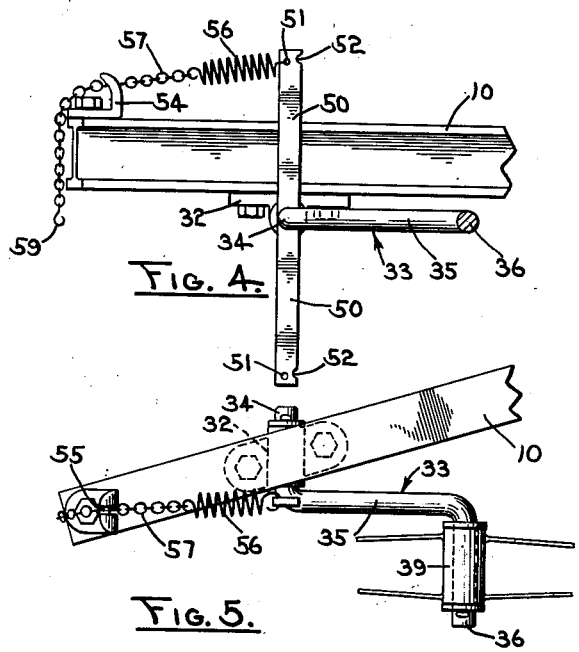
Fig. 4.
Fig. 5.
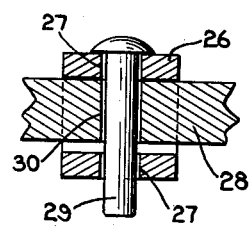
Fig. 6.
INVENTOR.
JOE ENOS, JR.

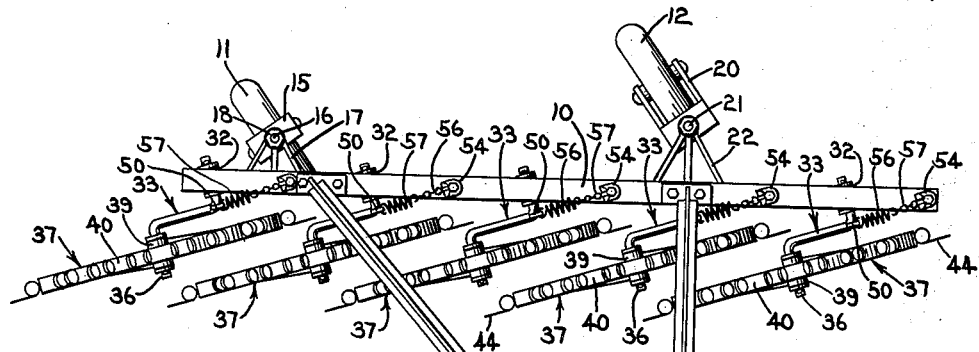
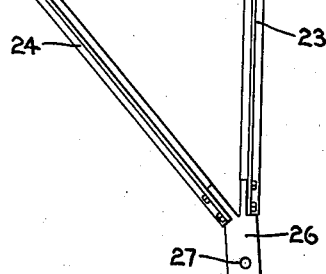
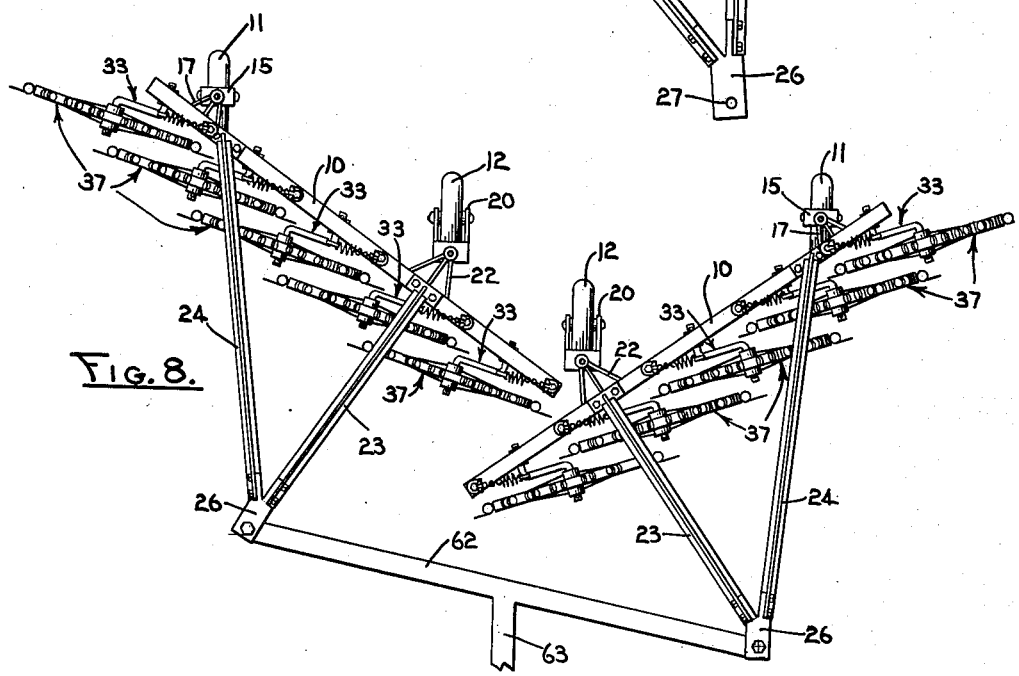

Patented June 8, 1954

2,680,343

UNITED STATES PATENT OFFICE 2,680,343

SIDE DELIVERY RAKE

Joe Enos, Jr., Visalia, Calif., assignor to
Melvin A. Morrill, Laton, Calif.

Application May 5, 1949, Serial No. 91,582

2 Claims. (Cl. 56—377)

The present invention relates generally to rakes and more particularly to an improved support and draft structure for rotary side delivery rakes employing rotary raking wheels arranged in echelon angularly disposed to the normal direction of earth-traversing movement.

A serious problem incident to the employment of rakes of the type referred to has been that of supporting and motivating the rotary raking wheels in a manner obviating all contact with crops being raked prior to the engagement of the raking wheels therewith. Before the present invention, it was considered impossible to support such raking wheels without a support wheel forward of the raking wheels which rolled over the crops preliminary to their raking, and thus considerable unnecessary shattering and crushing of hay, thrashing of beans, and other seed crops, and other undesirable effects were experienced. Extensive experimentation has been devoted by numerous implement manufacturers to the mounting of a support frame for such rotary raking wheels in buck relation on a tractor. Although such mounting has proved satisfactory for a single rotary wheel as employed in hay turners, it has proved entirely unsatisfactory for hay rakes employing sufficient raking wheels for effective operation.

It has been found possible to connect draft frames for such rakes at positions laterally removed from draft appliances, as on laterally extended booms, so that said rakes do traverse crops being raked without preceding contact by the draft appliance, but before the present invention it has been impossible to support such draft frames in a manner giving adequate frame elevation and attitude control without frame support wheels forwardly of the raking wheels.

Further, it has been found desirable to simplify the construction of such rakes to achieve resultant economies of manufacture incident to reduction in material utilized, reduction in the number of required parts, and minimizing of time and labor expenses. Substantial reductions in the weight of such rakes achieved by the present invention have not only reduced material costs but have minimized shipping and handling charges and achieved a rake having superior operable characteristics.

It frequently becomes desirable in adapting side delivery rakes to varied operational environments and equipment selectively to rake to opposite sides. In conventional side delivery rakes this has been impossible without completely reconstructing the same.

The broad essence of the present invention is believed to reside in the provision of improved draft support means for rotary raking wheels arranged in echelon angularly disposed to the normal direction of draft in which preliminary crushing or shattering of crops during raking operations is obviated, the weight and structure of rakes of the type greatly reduced and simplified, and a structure provided which may be assembled so as to rake selectively to the right or to the left of a line of draft.

An object of the present invention is therefore to obviate preliminary crop crushing and shattering in raking operations.

Another object is to simplify the support and draft structure in side delivery rakes employing a plurality of raking wheels arranged in echelon angularly disposed to the normal direction of earth-traversing movement.

Another object is to achieve substantial economies in the production and maintenance of the rakes of the type described in the preceding paragraph.

Another object is to provide a rake of the type described which may be assembled to rake to the right or to the left of its line of draft.

Another object is to provide a rotary side delivery rake employing a rotary raking wheel mounted for rotation about an axis angularly disposed to the normal direction of movement of the rake, which is adapted for connection to an elevationally positionable tool bar of a draft appliance and which enables accurate elevational positioning of the raking wheels in response to elevational positioning of said tool bar.

Another object is to provide an improved support and draft frame for mounting, for individual elevational movement, a plurality of rotary raking wheels arranged in echelon angularly disposed to the normal direction of movement of the rake in which the support frame facilitates adaptation of the raking wheels to uneven terrain traversed through variations in support frame attitude accurately responsive to instant average terrain slope encountered by the raking wheels.

Further objects are to provide improved elements and arrangements thereof in a device of the character set forth that is durable, dependable, and fully effective in its operation.

Still further objects and advantages will become apparent in the subsequent description in the specification.

In the drawings:

Fig. 3 is a rear elevational view of the rake viewed approximately axially of the rearwardmost raking wheel.

Fig. 4 is a somewhat enlarged fragmentary elevational view of one end of the main frame of the rake illustrating the raking wheel mounting.

Fig. 5 is a plan view of the construction shown in Fig. 4 with a wheel fragmentarily illustrated mounted thereon.

Fig. 6 is an enlarged vertical sectional view through the draft connection of the rake to a traction device, as taken along line 6—6 in Figure 2 of the drawing.

Fig. 7 is top plan view of the rake assembled for delivery of encountered crops to the side opposite that to which the rake in Figs. 1, 2, and 3 urge encountered crops.

Fig. 8 is top plan view of a pair of rakes gang hitched to a traction device in V relation for raking hay over a wide swath to a windrow at each side of the gang made convenient by the construction of the present invention.

Figure 1:
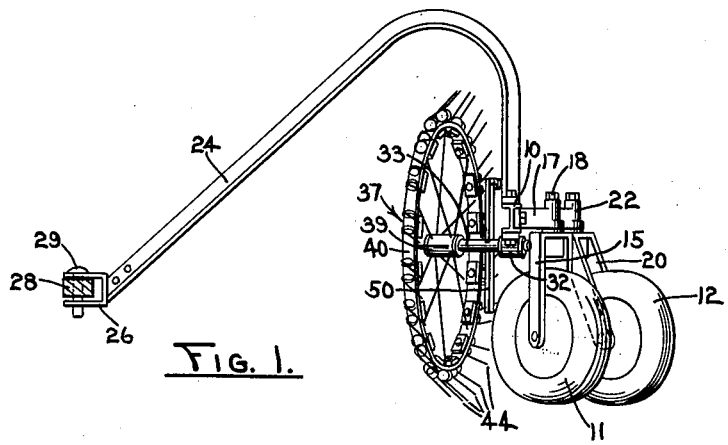
Fig. 1 is a side elevational view of a rotary side delivery rake employing the principles of the present invention.

Referring in greater detail to the drawing:

The rotary side delivery hay rake of the present invention is provided with a main frame member 10 preferably in the form of an I beam which extends horizontally and angularly transversely of the rake. The frame member may be made in the form of a length of structural metal of other cross sectional shape, such as a length of channel, angle or box-beam of rigid structure. The main frame member is supported for earth traversing movement on a directional control wheel 11 and a caster wheel 12. The directional control wheel 11 is rotatably mounted in adjustably selected planes of rotation relative to the main frame member so that the direction of movement of the rake and its horizontal attitude relative to a traction force is controlled in rudder effect by said wheel. This directional control wheel supports the main frame member 10 by providing a fork 15 in which the wheel 11 is journaled. A threaded stud 16 extends upwardly from the fork 15 in radial alignment which the wheel 11. A bracket 17 is secured to the rear side of the main frame member 10 and extends horizontally rearwardly therefrom having a vertical opening formed therethrough adapted rotatably to receive the threaded stud. A nut 18 is threadedly engageable with the upper end of the stud 16 to hold the fork in predetermined, adjustable, rotational attitude.

The caster wheel 12 is journaled in a rearwardly angled fork 20 having a threaded stud 21 extended upwardly therefrom. A bracket 22, similar to bracket 17 and spaced therefrom, is attached to the rear side of the main frame 10 and extends horizontally rearwardly therefrom having a vertical opening adapted to receive the stud 21 rotatably therein. The rotatable mounting of the supporting wheel 12 on the fork 20 is offset from the vertical axis of the stud 21 so that the wheel casters into rolling alignment with the direction of movement of the rake determined by traction forces applied thereto and the directional control wheel.

An arch bar 23 and a relatively longer arch bar 24, of T stock or other rigid material, are both provided with a foot so that they may be removably attached, as by bolting, in spaced relationship, to the upper side of the main frame member 10. Each of the arch bars 23 and 24 extends vertically upwardly from the frame member and is bent arcuately forwardly and thence downwardly to converge in a position forwardly of the main frame member, in a direction opposite from the control wheel 11 and swivel wheel 12. The forward converging ends of the arch bars 23 and 24 are adapted to be attached to a traction device so that the rake may be drawn in earth traversing movement. A clevis 26 is removably attached as by bolts to the forward terminal ends of the converging arch bars and has a pair of vertically aligned openings 27 formed therethrough. The clevis is adapted to be removably attached to an integral part of a traction device, such as an elevationally positionable tool bar 28, which may be laterally extended from the tractor to avoid tractor engagement with the crop if desired, by passing a pin 29 downwardly through the openings 27 and a vertical opening 30 formed through the tool bar. The openings 27 and the opening 30 are formed somewhat larger than the diameter of the pin 29 so that the clevis may rock transversely relative to the draft plate whereby relative universal motion is obtained between the clevis and draft plate, with relative pivoting on a vertical axis and relative transverse rocking motion on a horizontal axis.

With the frame member 10 supported on the transversely spaced wheels 11 and 12 rearwardly of the beam, and supported forwardly of the beam by the universal connection of the clevis 26 to a traction device, the rake frame maintains a constant attitude relative to the average slope of terrain traversed by the rake. The frame including the main frame member 10 and the arch bars 23 and 24 is thus provided with three point support, causing the main frame member to be supported a substantially fixed distance above the ground traversed regardless of irregularities in the ground traversed by the rake such as mounds, depressions, irrigation dikes, or ditches. The angularity of the directional control wheel 11 is adjustable on a vertical axis so that the horizontal oblique angular position of the I beam relative to the clevis connection of the rake to a traction device is varied within efficient raking limits.

A plurality of pillow blocks and bearings 32 are removably attached, as by bolting, in spaced relation along the under side of the main frame member 10, as shown in Fig. 3. The axes of the bearings 32 extend substantially horizontally and slightly angularly across the main frame member. A like plurality of Z-shaped cranks 33 are provided, individually having a shaft portion 34 journaled in a bearing 32, a rearwardly extended portion 35, and an axle portion 36 substantially parallel to the shaft portion. Each crank 33 extends substantially horizontally rearwardly of its respective bearing 32. A raking wheel 37 is rotatably mounted on the axle portions 36 of the cranks 33. The radii of the raking wheels are preferably substantially equal to the ground height of the bearings. The wheels are preferably arranged for rotation in planes approximately 45° displaced from alignment with the normal direction of movement of the rake.

Each raking wheel 37 is constructed with a central hub portion 39 journaled on its respective axle 36 and a concentrically positioned flat rim 40 with a plurality of radially extending spokes connected between the hub and rim of the raking wheel. The bearings 32 are located in positions and the diameters of the raking wheels are such that the raking wheels are located in overlapping relation, overlapping each other by substantially the radii of the wheels, and axially angularly located relative to the direction of movement of the rake. The wheels are arranged in forwardly overlapping echelon arrangement angularly disposed to the normal direction of movement of the rake. The arch bars extend upwardly in their arcuate portions sufficiently to clear raking wheels even when maintained in spaced relation above the ground during transportation of the hay rake.

Each of the raking wheels 37 is provided with a plurality of radially extending flexible raking teeth 44 which are attached to the rim of the raking wheel by means of a clamping block 45.

Means are provided for controllably counterbalancing the weight of each of the raking wheels so that they each rest on the ground and/or encountered crops in various adjusted amounts less than their full weights. This means for relieving the weight of each of the raking wheels comprises an arm 50 rigidly attached individually to the cranks 33 adjacent to the shaft portions 34 and extended substantially vertically, upwardly and downwardly, radial relative to the shaft portions. Each terminal end of each arm 50 has an opening 51 formed therethrough and a notched portion 52 formed adjacent to each opening. A plurality of brackets 54 are attached along the upper side of the main frame 10, one bracket being located in spaced relation forwardly of each of the cranks 33. Each bracket 54 is provided with a vertical slot 55, as shown in Fig. 5. A helical tension spring 56 is connected at one of its ends in the opening 51 at the upper end of each of the arms 50 and at the opposite end to a chain 57. A hook 59 is attached to the free terminal end of each of the chains 57. A link of each chain 57 is adapted to be attached in the slot 55 of its respective bracket 54 with the spring 56 under selected initial tension. By attaching various links along the length of each chain 57 in its respective bracket 54, the tension of each spring 56 may be adjustably varied so that the weight of each wheel may be counterbalanced or relieved to the extent desired for raking hay. By adjusting the tension of each of the springs 56, the raking wheels may be caused yieldably to engage the ground with their full weight, with only part of their weight, or may be held yieldably in slight ground contact or in spaced relationship above the ground traversed. Thus each raking wheel may be adjusted to engage the ground to the extent desired for desired operation of the rake.

The plurality of raking wheels 37 may be elevated to a raised position out of contact with the ground traversed by the rake so that the rake may be transported from one place to another. To achieve this, each chain 57 is adjusted longitudinally in the slot of its respective bracket 54 so that its respective spring 56 is under sufficient tension to lift its respective wheels clear of the ground. The raking wheels are thereby individually lifted to the desired elevated position and the hook 59 at the terminal end of the chain is hooked or engaged with its respective notch 52 to maintain said elevated condition.

Figure 2:
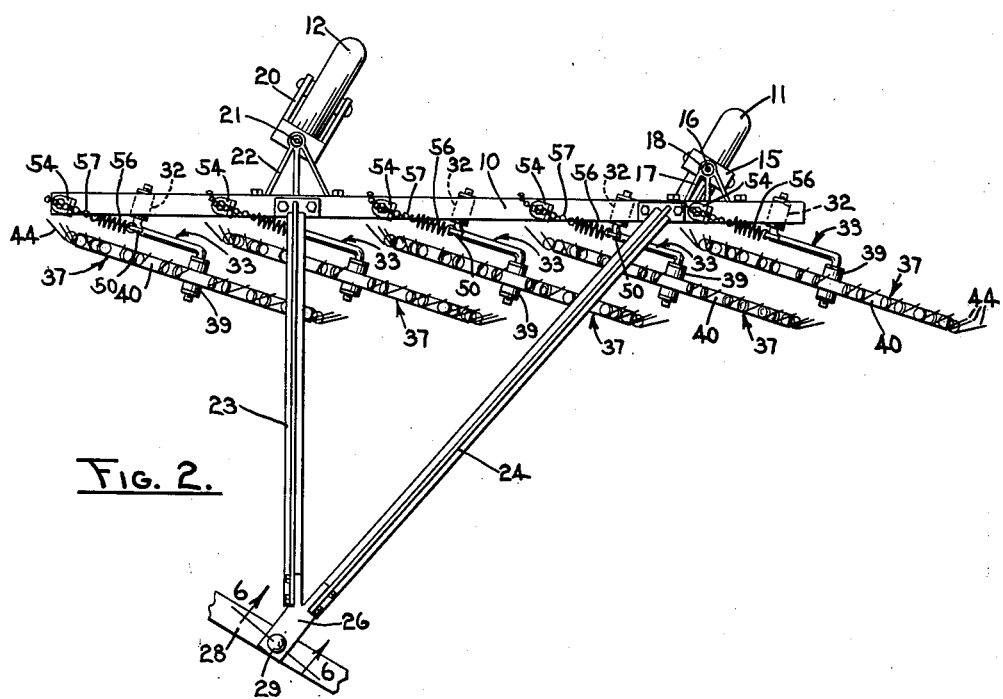
Fig. 2 is a top plan view of the rotary side delivery rake.

As shown in Fig. 2 of the drawing, the rake is adapted to gather and move hay to a windrow at the left hand side of the rake. The rake as shown and described is also adapted to rake hay into a windrow at the right hand side of the rake. To convert the rake to rake to the opposite side, the arch bars 23 and 24 are disconnected from the main frame member 10. The studs 16 and 21 of the forks 15 and 20 respectively are removed from their respective brackets 17 and 22. The bearings 32 and the brackets 54 are also removed from the main frame member 10. The main frame member is then inverted. The forks 15 and 20 are reassembled in their respective brackets 17 and 22 in supporting relation to the frame member 10 with the directional control wheel 11 held in adjusted swivel position and the support wheel 12 swivelly mounted. The arch bars are reassembled on the main frame member in exchanged positions, as shown in Fig. 7 of the drawing. The bearings 32 are again attached to the present underside of the I beam and the brackets 54 are attached to the upper side of I beam in spaced relation to each of the bearings 32. The chains 57 and springs 56 are adjusted as before but attached to the opposite ends of the arms 50 to which they were formerly attached.

By employing a pair of rakes, one adapted to rake hay to the left side thereof and the other adapted to rake hay to the right side thereof, the rakes may be assembled in V relation as shown in Fig. 8 of the drawing, so that they may rake hay over a wide swath and deliver the hay into a windrow at each side of the rakes thus assembled. The reversely angled hay rakes are assembled with the clevis 26 of each rake pivotally connected to the opposite end of a draft beam 62 which may be an integral portion of the traction device or may have a tongue 63 securely attached thereto for connection to a traction device. The directional control wheel 11 of each of the reversely angled hay rakes are angularly positioned so that the rakes assume substantially the positions as shown in Fig. 8, with the forwardly located wheel of each rake overlapping the forward wheel of the other rake. The raking wheel of each hay rake engages the crop being raked and moves it transversely outwardly, each raking wheel outwardly and rerawardly of such wheels subsequently engaging the crop and continuing it outwardly to the rearmost raking wheel of each rake. The rearmost wheel of each rake delivers the crop in to a windrow at each opposite side of the assembled rakes.

*Operation*

The operation and utility of the present invention is believed to be apparent from the foregoing description and is briefly summarized at this point. Preparatory to operation of the rotary side delivery rake of the present invention, the clevis 26 of the rake is pivotally connected and supported on the tool bar 28 of a traction device by means of the pin 29. The rake is thus provided with a three point support, being supported at its forward end on the traction device and at its rearward portion on the transversely spaced wheels 11 and 12. The pin 29, having a loose fit in the openings through the clevis 26 and the tool bar 28, provides a universal attachment of the hay rake to the traction device so that as the ray rake is caused to traverse the ground, the rake may tilt in response to mounds and depressions encountered by the spaced wheels and somewhat less responsively to the elevation of the traction device.

The angularity of the directional control wheel 11 is adjusted by manual loosening and subsequent tightening of the nut 18 on the stud 16.

The swivelly mounted support wheel 12 automatically aligns itself with the direction of movement of the hay rake. The angularity of the main frame member and raking wheels determines the width of the swath of hay raked. The adjustment of the directional control wheel 11 permits adaptation to varied operational requirements. Under normal operating conditions swath regulation should be limited to raking wheel positions relative to the line of draft of from 30 to 60 degrees.

Each of the raking wheels 37 is mounted on the raking frame for vertical movement relative to the frame and the weight of each wheel is adjustably counterbalanced by means of a helical coil, as described, connected between the arm 50 and its respective bracket 54. The tensioning of each spring is adjusted to the desired amount so that the raking wheels are in ground or crop engagement as the rake is moved forwardly. Light crop engagement minimizes dirt collection. With the raking wheels vertically movable and counterbalanced, they are not destructive to dikes, checks, borders, ditches and the like and rake effectively thereacross.

Rotation is imparted to the raking wheels in the manner well known in rakes of the type. As the rake moves forwardly, rearward drag of encountered crops and/or the earth rotates the angularly positioned wheels and such rotation results in a drawing of encountered crops sidewardly with a minimum of rolling, tangling, shattering, and other difficulties incident to excessive handling.

The lateral spacing of the wheels 11 and 12 adjacent and in the following relation to the raking wheels 37 causes the main frame member 10 to assume attitudes during earth traversing movement generally averaging the slope of the ground transversely of the rake over which the rake is drawn. Such constant tilt adaptation is permitted by the relative universal connection provided by the pin 27, as previously described. This adjustment of frame attitude is of significance in that it reduces the requisite elevational movement of the individual raking wheels relative to the frame member 10 accurately to conform to uneven terrain. In operation over uneven ground, the frame member 10 may be observed to shift its attitude continually in response to the vertical movement of the wheels 11 and 12 and the raking wheels 37 individually to shift constantly relative to the member 10 for more minute adaptation.

The structure of the raking frame of the present invention permits the assembling thereof for selective right and left hand side delivery relative to a line of draft without the substitution or replacement of any parts. As shown in Fig. 8 this enables the ready formation of a V rake for bilateral raking.

During raking operations no portion of the rake engages encountered crops preliminary to the raking operation itself; thus objectionable shattering, thrashing, crushing, and the like are eliminated. The structure is readily disassembled for compact crating for shipping and is only a fraction of the overall weight heretofore believed unavoidable in rakes of the type. For the first time, such a rake has been provide in which the rotary raking wheels are elevationally positionable in response to elevational positioning of a draft connection. As the tool bar 28 is raised and lowered, the rake pivots vertically on the axles of the wheels 11 and 12 and the raking wheels are responsively raised and lowered relative to earth traversed for heavier or lighter crop contact and for complete ground clearance, as for transporting purposes.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and structures.

Having described my invention, what I claim is new and desire to secure by Letters Patent is:

1. In a side delivery rake having a plurality of raking elements whose individual raking efficiency is dependent upon their attitude relative to the vertical and relative to their line of earth traversing movement and is also dependent upon their elevation relative to terrain traversed, which elements are arranged in echelon, and which rake includes means for individually mounting the raking elements for individual elevational movement in response to elevations and depressions in terrain traversed; a support structure for the raking elements and mounting means comprising an elongated substantially straight beam having opposite transverse sides adapted for connection of the mounting means thereto with the raking elements disposed along a side thereof in substantially constant attitude relative to the beam independent of their individual elevational movements, a pair of acutely angularly related arch bars having convergent ends and spaced opposite ends rigidly connected to the beam, said bars being arched upwardly over the raking elements and having the convergent ends disposed on the same side of the beam as the raking elements and opposite to the raking elements from the beam, a draft coupling interconnecting the convergent ends of the arch bars adapted to support said ends of the arch bars on a draft appliance, a pair of brackets mounted on the beam individually adjacent to the spaced ends of the arch bars and oppositely extended from the beam relative to the raking elements, and mobile ground supports mounted on the brackets in supporting relation to the frame, one of said arch bars being substantially shorter than the other whereby during earth traversing movement the beam is drawn obliquely to the line of travel and has relatively forward and rearward end portions and the bracket adjacent to the shorter arch bar being extended from the beam a distance greater than the distance of extension of the opposite bracket whereby the effect on the attitude of the raking elements incident to relative elevational movements of the draft connection and the mobile ground support connected to the longer bracket is greater than that incident to relative elevational movement of the draft connection and the ground support connected to the shorter bracket and the elevational movement of the rearward end of the frame more acutely responsive to elevational movement of the ground support on the shorter bracket than the elevational movement of the forward end of the frame is responsive to such movement of the ground support on the longer bracket.

2. In a side delivery rake adapted for earth traversing movement and having a plurality of ground driven raking wheels arranged in overlapping relation in echelon whose raking efficiency is dependent upon their attitudes relative to the vertical during earth traversing movement and elevation relative to terrain traversed, and crank arms individually mounting the raking wheels for free rotation and independent elevational movement; a support structure for the raking wheels and crank arms comprising a swivel ground support wheel, a direction control ground support wheel, a draft connection adapted for support on a draft appliance, substantially rigid frame means interconnecting the support wheels and the draft connection in fixed spaced relation, with the direction control wheel in greater spaced relation to the draft connection than the swivel wheel, the swivel wheel laterally spaced from the direction control wheel, and the direction control wheel mounted for rotation in a substantially erect plane in fixed relation to the frame extending in adjacent spaced relation to the draft connection to the side thereof opposite that from which the swivel wheel is laterally spaced from the direction control wheel, an elongated substantially straight frame beam mounted in the frame obliquely to the plane of the direction control wheel between the support wheels and the draft connection and having a rearward end portion adjacent to the direction control wheel and a forward end portion adjacent to the swivel wheel but spaced therefrom more than the rearward end portion thereof from the direction control wheel, and bearings mounted on the beam pivotally receiving the crank arms of the raking wheels with the raking wheels obliquely disposed to the plane of the direction control wheel in substantially erect positions whereby as the raking wheels are drawn in earth traversing movement the attitudes of the raking wheels relative to the vertical are more acutely controlled by the relative elevational movement of the draft connection and swivel wheel in traversing elevations and depressions than by the relative elevational movements of the draft connection and the direction control wheel and the forward end portion of the frame beam progressively elevationally positioned at a more nearly average of the elevational movements of the swivel wheel and the draft connection than the progressive elevational positioning of the rearward end of the frame beam by its closely adjacent direction control wheel and the more remotely spaced draft connection.

References Cited in the file of this patent

UNITED STATES PATENTS

| Number | Name | Date |
|---|---|---|
| 78,798 | Furney | June 9, 1868 |
| 406,363 | Mann | July 2, 1899 |
| 1,896,234 | Hathorn | Feb. 7, 1933 |
| 2,179,583 | Wilson | Nov. 14, 1939 |
| 2,213,967 | Roche | Sept. 10, 1940 |
| 2,447,354 | Morrill | Aug. 17, 1948 |
| 2,472,260 | Morrill | June 7, 1949 |
| 2,476,183 | Fergason | July 12, 1949 |
| 2,511,100 | Clark | June 13, 1950 |
| 2,518,303 | Godley | Aug. 8, 1950 |
| 2,545,723 | Connea | Mar. 20, 1951 |